Patented Mar. 11, 1941

2,234,378

UNITED STATES PATENT OFFICE 2,234,378

PROCESS FOR THE EXTRACTION OF THE VALUABLE CONTENTS FROM ANTIMONIAL, ARSENICAL, AND OTHER COMPLEX ORES

Peter Francis Loring, Pretoria, Transvaal, Union of South Africa

No Drawing. Application June 20, 1939, Serial No. 280,056. In the Union of South Africa July 12, 1938

8 Claims. (Cl. 75—6)

This invention relates to an improved process for treating complex ores, particularly antimonial and arsenical gold ores, for the recovery of their valuable contents.

According to the invention broadly as applied to complex gold ores, tar or pitch is thoroughly mixed with the ground ore, whereafter it is heated in a non-oxidizing atmosphere until a porous coke-like mass is formed. Thereafter the resulting coke-like substance is roasted in an oxidizing atmosphere to oxidize and drive off the volatile constituents, and the residue is then treated by known methods for the extraction of the gold content therefrom. By treating ores of the above referred to type in this manner, it has been found that fritting of the antimony does not take place, and it does not combine with the gold content. In fact it oxidizes completely without any sign of softening and will leave the gold free to be extracted from the remaining non-volatile constituents of the ore. The oxidizing may be carried out at any suitable temperature, without any risk of fritting or losing gold.

According to a preferred method of carrying out the invention in practice, the ground ore is thoroughly mixed with coal tar and the mixture thereafter placed in a closed vessel termed an absorption chamber. This chamber is preferably in the form of a metal vessel having a substantially air-tight lid or closure. After sealing, this chamber is placed in an oven furnace and brought to a temperature between dull red and bright red. It is kept at this temperature until the mass has an appearance and structure resembling coke. This coke-like mass is then subjected to a roasting treatment in an oxidizing furnace preferably of the tube type until the whole of the oxidizable and volatile constituents are driven off in the form of gases or vapors, whereafter the residual discrete mass is treated in known manner for the recovery of the gold content therefrom.

In cases where the magnetic iron sulphides are extracted by means of a magnet, and all the foreign matter removed by oil flotation, care must be taken, since the reaction in the furnace will result in a residue of practically pure gold.

If desired, the oxidized products which are driven off in the gaseous or vapor form may be collected in traps or filters and, after purification and other treatment, will provide useful by-products of the process.

Great difficulty has been experienced in eliminating the sulphur of complex ores particularly in the case of stibnite where fritting and/or melting occurs when this ore is subjected to heat.

According to the invention this fritting and melting of antimony sulphide is overcome. It is apparently due to a physical change and a possible chemical modification of the stibnite due to the action of the tar or pitch on the stibnite under the influence of heat. It would appear that when a mixture of stibnite and tar is heated in a closed chamber, a reaction takes place by which the tar, sulphur and stibnite form a coke-like mass which may be heated to a 1000° F. without any suggestion of the stibnite melting or fritting. It would appear that, due to the low melting point and great heat conductivity of tar, the reaction takes place before the stibnite melts. It would also appear that during the reaction any excess of tar is distilled off, the volatile content consisting of gases passing into the air, together with large quantities of sulphur which are also released in the form of gases and free sulphur.

The remaining coke-like mass appears to contain an altered stibnite which can be oxidized without any difficulty.

Tar would therefore appear to be a very powerful desulphurizing agent and can be used with arsenical ores and other ores where the presence of sulphur has made treatment difficult and uneconomical. By employing the tar as a sweetening compound successful results are produced.

Although the process has been described with reference to its application to the treatment of gold ores, it may conveniently be used in the treatment of other complex ores, for the recovery of their constituents.

To enable the invention to be more clearly understood and carried into practice, a description of its use in the treatment of a sample of gold bearing stibnite ore, will now be given:

First of all a metal vessel having a suitable lid or closure which fits sufficiently closely to prevent free access of air, but which permits free escape of the evolved gases and sulphur, was taken. A metal pot having a substantially close-fitting lid meets the case.

Into this vessel was placed 10 lbs. of finely ground stibnite ore together with sufficient commercial coal tar to form a saturated pasty mass when thoroughly mixed, the proportion of tar to ore being approximately as 1 is to 10 by weight.

The size of the vessel was such that it was not completely filled. This made provision for expansion and the free evolution of gases and vapors.

The vessel with its contents was then placed on an open coal fire so that it was surrounded on its sides with burning coal. The temperature to which it was raised was of the order of 400 degrees to 600 degrees Fahrenheit. This heating was continued for two hours.

During the heating process it was noticed that firstly, excess tar was distilled off, followed by the expulsion of free sulphur. Upon raising the lid a blue flame (apparently the blue sulphur flame) was evident, which flame continued until removal of the vessel from the fire. Thereafter the porous coke-like mass, which had formed, was knocked out and broken up into lumps about one inch in size. This was done to facilitate the subsequent oxidizing step.

The lumps of coke-like substance were then placed in an oxidizing furnace constructed of a twelve inch diameter iron tube four feet in length, in which were placed three longitudinally disposed grids.

The grids were in spaced superposed relationship with the top grid of ¼ inch mesh and the two lower grids of one eighth inch mesh. The tube was arranged with its axis horizontal and was so placed that the maximum part of its middle portion was adapted to be surrounded by a fire while both ends thereof projected slightly beyond the flames. One end was left open for charging and the free admission of air, while the other end was connected to a flue so as to cause a current of air to be drawn through the tube.

The broken lumps of the coke-like mass were then placed on the topmost grid and the tube heated up. As oxidation proceeded a fine greyish ash formed on the pieces of coke-like substance. These were raked from time to time to free them from this ash and cause it to fall to the bottom of the tube. Eventually all the pieces were reduced to this fine ash which collected on the bottom of the tube.

While this oxidation was proceeding dense fumes were liberated and allowed to pass off into the atmosphere. The oxidation was continued in this way until no more of these white fumes (apparently oxides of antimony) were liberated on raking of the mass in the tube. When this stage is reached the process is complete and the residual ash-like substance may then be treated in known manner, such as by cyaniding, for the recovery of the gold content. In the above example a gold extraction of 94% was obtained.

I claim:

1. An improved process for treating complex ores containing sulphur and antimony for the recovery of their valuable constituents which comprises the steps of, reducing the ore to a fine state of subdivision, thoroughly mixing therewith sufficient tar or pitch to form a pasty mass, heating this mixture in a non-oxidizing atmosphere to distill off excess tar and pitch and to expel the free sulphur without melting, vaporizing or reducing the sulphides therein, thereby forming said mass into a porous coke-like substance containing all the sulphides bound together by a readily combustible matrix of a carbon-sulphur substance, roasting this coke-like substance in an oxidizing atmosphere so as to oxidize the antimony and sulphur and drive off the volatile constituents, and thereafter treating the resulting residue in known manner for the extraction of its valuable content.

2. An improved process for treating complex ores containing sulphur such as antimonial and arsenical gold ores for the recovery of their valuable constituents which comprises the steps of, reducing the ore to a fine state of subdivision, thoroughly mixing therewith sufficient tar or pitch to form a pasty mass, heating this mixture in a non-oxidizing atmosphere to distill off excess tar and pitch and to expel the free sulphur without melting, vaporizing or reducing the sulphides therein, thereby forming said mass into a porous coke-like substance containing all the sulphides bound together by a readily combustible matrix of a carbon-sulphur substance, roasting this coke-like substance in an oxidizing atmosphere so as to oxidize the arsenic, antimony and sulphur and drive off the volatile constituents, and thereafter treating the resulting residue in known manner for the extraction of the gold content.

3. An improved process for treating complex metallic ores containing sulphur, arsenic and antimony for the recovery of their valuable constituents which comprises the steps of, reducing the ore to a fine state of subdivision, thoroughly mixing therewith sufficient tar or pitch to form a pasty mass, heating this mixture in a closed vessel to distill off excess tar and pitch and to expel the free sulphur without melting, vaporizing or reducing the sulphides therein, thereby forming said mass into porous coke-like substance containing all the sulphides bound together by a readily combustible matrix of a carbon-sulphur substance, reducing this mass to lumps of convenient size and roasting it in an oxidizing atmosphere to which free access of air is admitted to oxidize the arsenic, antimony and sulphur, periodically raking said lumps and continuing such heating until all the voltaile constituents have been oxidized and/or driven off in the form of gases or vapors, and thereafter treating the resulting discrete residue in known manner for the extraction of the metal content.

4. An improved process as claimed in claim 2, wherein a concentrate of the ore is employed as the starting material.

5. An improved process as claimed in claim 2, wherein the proportion of tar or pitch to ground ore is substantially as one is to ten by weight, and wherein the temperature to which the mixture is raised during the step of heating it in a non-oxidizing atmosphere, is of the order of 300 degrees to 1000 degrees Fahrenheit.

6. In an improved process for treating complex ores as claimed in claim 1, collecting the products driven off in gaseous or vapor form during the heating steps, and thereafter separating and purifying said products.

7. In an improved process for treating complex ores as claimed in claim 2, collecting the products driven off in gaseous or vapor form during the heating steps, and thereafter separating and purifying said products.

8. In an improved process for treating complex ores as claimed in claim 3, collecting the products driven off in gaseous or vapor form during the heating steps, and thereafter separating and purifying said products.

PETER FRANCIS LORING.